(12) United States Patent  
Balla

(10) Patent No.: US 6,173,000 B1  
(45) Date of Patent: Jan. 9, 2001

(54) OSCILLATOR AND AMPLIFIER FOR DUAL DISCHARGE TUBE EXCIMER LASER

(76) Inventor: R. Jeffrey Balla, 5109 Goldsboro Dr., No. 8E, Newport News, VA (US) 23605

(*) Notice: Under 35 U.S.C. 154(b), the term of this patent shall be extended for 0 days.

(21) Appl. No.: 09/349,632

(22) Filed: Jul. 8, 1999

(51) Int. Cl.[7] .................................................. H01S 3/22
(52) U.S. Cl. ............................ 372/57; 372/92; 372/98; 372/100; 372/20; 372/103
(58) Field of Search ............................ 372/57, 20, 100, 372/103, 92, 98, 93

(56) References Cited

U.S. PATENT DOCUMENTS

| | | | |
|---|---|---|---|
| 4,644,555 | * 2/1987 | Amano | 372/92 |
| 4,897,849 | * 1/1990 | Hughes | 372/93 |
| 5,812,308 | * 9/1998 | Kafka et al. | 372/93 |

* cited by examiner

Primary Examiner—Leon Scott, Jr.  
(74) Attorney, Agent, or Firm—Peter J. Van Bergen

(57) ABSTRACT

A dual discharge tube excimer laser is provided. An oscillator having a first discharge tube generates a laser beam having a cross-sectional shape as initially defined by the first discharge tube. The oscillator selects a bandwidth of the laser beam and maintains the cross-sectional shape of the laser beam within the oscillator and as it exits the oscillator. The laser beam exiting the oscillator is amplified by one pass through the first discharge tube and two passes through a second discharge tube.

25 Claims, 3 Drawing Sheets

OSCILLATOR AND AMPLIFIER FOR DUAL DISCHARGE TUBE EXCIMER LASER

STATEMENT OF GOVERNMENT INTEREST

The invention described herein was made by an employee of the United States Government and may be manufactured and used by or for the Government for governmental purposes without the payment of any royalties thereon or therefor.

FIELD OF THE INVENTION

The invention relates generally to excimer lasers, and more particularly to an oscillator that provides for narrow/variable bandwidth selection and an amplifier that provides improved spectral brightness for a dual discharge tube excimer laser.

BACKGROUND OF THE INVENTION

Dual discharge tube excimer lasers are used in a variety of applications to include spectroscopy, combustion diagnostics, harmonic generation, stimulated Raman scattering, Brillouin scattering, laser fusion and remote sensing. A standard optical set-up for a dual discharge tube excimer laser is shown schematically in FIG. 1 and referenced generally by numeral 10.

Excimer laser 10 has first and second discharge tubes 12 and 14, respectively. Discharge tubes 12 and 14 are filled with gas mixtures such as argon fluoride, krypton fluoride, xenon chloride, xenon fluoride, etc., as is known in the art of excimer lasers. The oscillator portion of excimer laser 10 includes: discharge tube 12; variable circular aperture elements 16 and 18 disposed at either end of discharge tube 12; optical prisms 20, 22 and 24; an optical grating 26; and an output coupler 30.

As is known in the art, when discharge tube 12 is energized (i.e., its electrodes are energized), a gaseous lasing medium is generated in discharge tube 12 and transmitted therefrom as a laser beam. The laser beam passes through aperture element 18 and impinges on the front surface of each of prisms 20/22/24 at Brewster's angle before impinging on optical grating 26. The cross-sectional shape of the lasing medium and resulting laser beam is defined by discharge tube 12. The bandwidth of the laser beam is selected as the beam is transmitted back through prisms 20/22/24 and aperture element 18 before re-entering discharge tube 12. The bandwidth-defined laser beam exits the opposite side of discharge tube 12 and passes through aperture element 16 before impinging upon output coupler 30 which is typically a partially reflective mirror. Output coupler 30 outputs a laser beam 32 which is turned 180° by mirrors 34 and 36.

Laser beam 32 is amplified by a combination of a concave mirror 38, discharge tube 14 and a window mirror 40 where mirrors 38 and 40 form an unstable resonator. Specifically, laser beam 32 first passes through a small hole (not shown) in concave mirror 38 and discharge tube 14 before impinging on window mirror 40. Mirror 40 has a flat window portion 40A with a meniscus lens 40B at its center. Flat window portion 40A is slightly reflective (e.g., 10%) at the wavelength(s) of interest while meniscus lens 40B is highly reflective (e.g., 95%) at its center. As a result of this structure, the laser beam passes back through discharge tube 14 along a laser beam path 32A. Laser beam path 32A exits discharge tube 14, reflects off concave mirror 38, and is directed back through discharge tube 14 along a laser beam path 32B which exits flat window portion 40A of mirror 40 as the output laser beam. That is, three passes through discharge tube 14 are used to amplify the laser beam.

While the above-described excimer laser design performs satisfactorily, improvements in terms of decreased divergence, increased output energy, locking efficiency, range of tunability and spectral brightness are goals that are continually sought.

SUMMARY OF THE INVENTION

Accordingly, it is an object of the present invention to provide a dual discharge tube excimer laser having improved performance characteristics.

Another object of the present invention to provide a dual discharge tube excimer laser that can achieve decreased divergence, and increased output energy, locking efficiency, range of tunability and spectral brightness.

Still another object of the present invention to provide a dual discharge tube excimer laser that can easily be adjusted to operate over a range of bandwidths.

Other objects and advantages of the present invention will become more obvious hereinafter in the specification and drawings.

In accordance with the present invention, an excimer laser is provided in which an oscillator having a first discharge tube generates a laser beam having a cross-sectional shape as initially defined by the first discharge tube. The oscillator including means for selecting a bandwidth of the laser beam and means for maintaining the cross-sectional shape of the laser beam within the oscillator and as the laser beam exits the oscillator. An amplifier receives the laser beam exiting the oscillator. The amplifier includes a second discharge tube. During amplification, the laser beam is passed once through the first discharge tube and then twice through the second discharge tube.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 2:
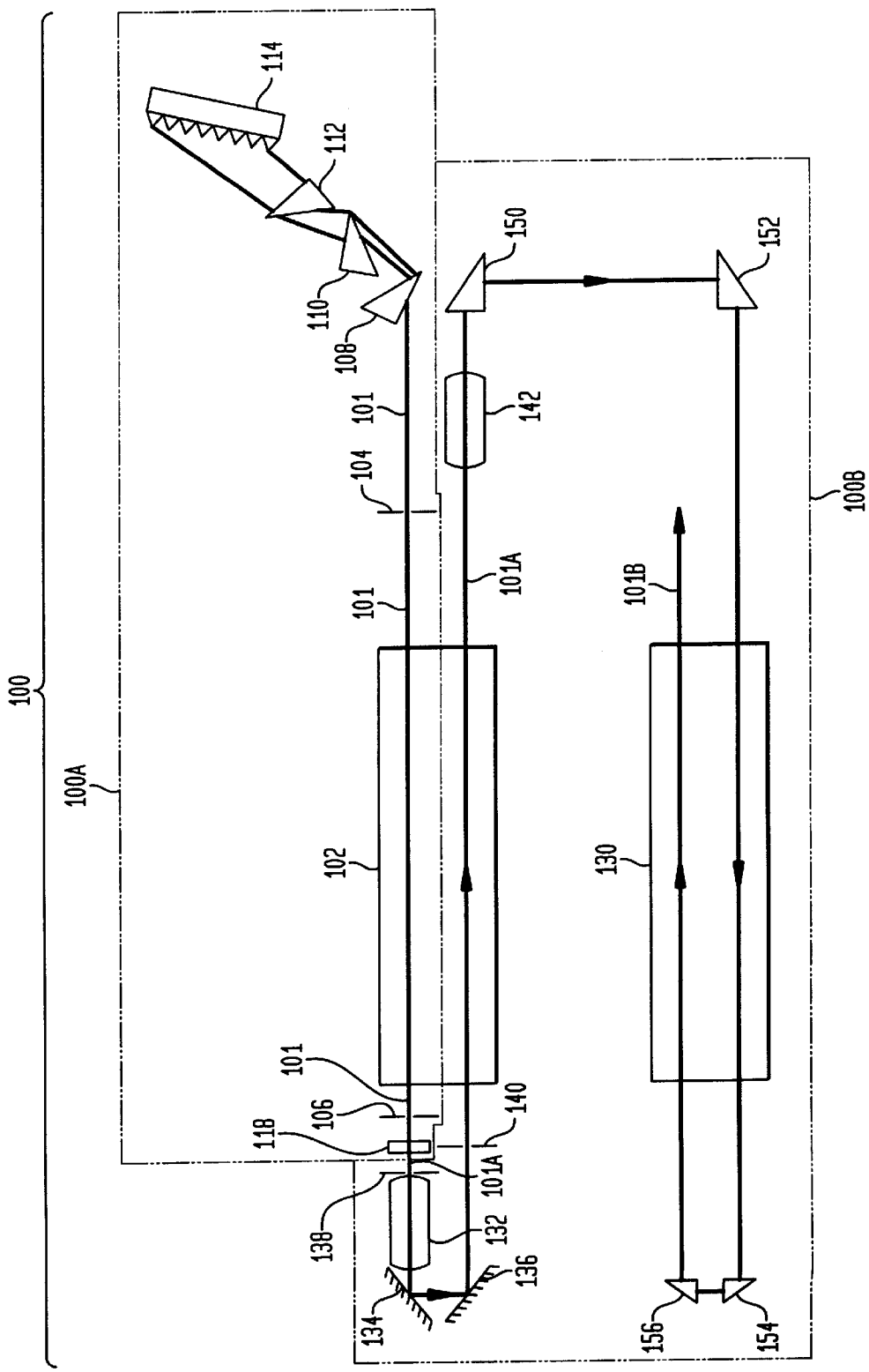
FIG. 2 is a schematic view of one embodiment of an improved dual discharge tube excimer laser according to the present invention.

Referring now to the drawings, and more particularly FIG. 2, an embodiment of a dual discharge tube excimer laser according to the present invention is shown and referenced generally by numeral 100. Excimer laser 100 has an oscillator portion contained within dashed line 100A and an amplifier portion contained within dashed line 100B.

Oscillator portion 100A includes a discharge tube 102 filled with a gaseous medium and electrodes (not shown) that are energized to generate a lasing medium. The gaseous medium can be any gas mixture used in excimer lasers as known in the art. The geometry of discharge tube 102 to include its electrodes defines the cross-sectional shape of the initially-generated lasing medium within tube 102. For example, a discharge tube having top and bottom electrodes extending nearly the length of the discharge tube produces a rectangular lasing medium and a laser beam (e.g., laser beam 101) having a rectangular cross-section. (When the lasing medium first exits discharge tube 102, it is referred to as laser beam 101 which has the same cross-sectional shape as the lasing medium.) Such a discharge tube/electrode geometry is described in detail in Chapter 4 of "Excimer Lasers," edited by Charles K. Rhodes, Topics in Applied Physics, Volume 30, Springer-Verlag, Berlin 1984. However, it is to be understood that other tube/electrode geometry and resulting laser beam cross-sectional shapes can be used without departing from the scope of the present invention.

Disposed at either end of discharge tube 102 are the optics necessary to oscillate laser beam 101 back and forth through tube 102 in order to generate a high-output laser beam that will exit oscillator portion 100A. For clarity of description, the portion of laser beam 101 exiting oscillator portion 100A will be referred to herein as laser beam 101A. The optics of oscillator portion 100A maintain the cross-sectional shape of laser beam 101 within oscillator portion 100A and as it exits oscillator portion 100A as laser beam 101A. The importance of maintaining the cross-sectional shape of the laser beam will be discussed further below.

Positioned at either end of discharge tube 102 are optical slits or aperture elements 104 and 106. The geometrical shape of the slit formed in each of aperture elements 104 and 106 matches the cross-sectional shape of laser beam 101. In the illustrated example, aperture elements 104 and 106 are rectangular to match the cross-sectional shape of laser beam 101. The slit width of aperture element 106 can be wider than that of aperture element 104 in order to compensate for alignment errors. The matching of the oscillator's aperture geometry to laser beam cross-sectional geometry contrasts with prior art designs where circular apertures are always used. Note that if a circular aperture is made large enough to allow a rectangular beam to pass through, an excessive amount of amplified spontaneous emission (ASE) is also passed. However, if a circular aperture diameter is decreased to reduce ASE, laser beam cross-sectional area and laser beam power is reduced.

Positioned adjacent aperture element 104 are optics that will be used to partially define the bandwidth of laser beam 101. In the illustrated embodiment, the conventional three prisms 108/110/112 and optical grating 114 can be used to select a bandwidth and retro-reflect laser beam 101 back through aperture element 104. Bandwidth can be changed by changing the angle of incidence of optical grating 114 and/or the number of grating grooves on optical grating 114. The slit width of aperture element 104 can be varied to further define the bandwidth for a given prism/optical grating arrangement. In general, it was found that for a given prism/optical grating arrangement, increasing the slit width of aperture element 104 increased the bandwidth of laser beam 101.

Figure 3:
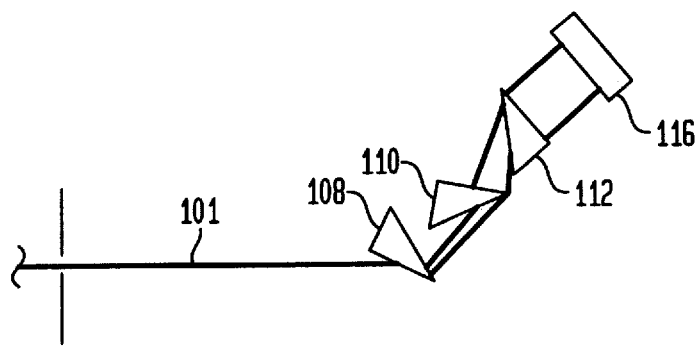
FIG. 3 is a schematic view of a portion of the oscillator in another embodiment of the dual discharge tube excimer laser.
Figure 4:
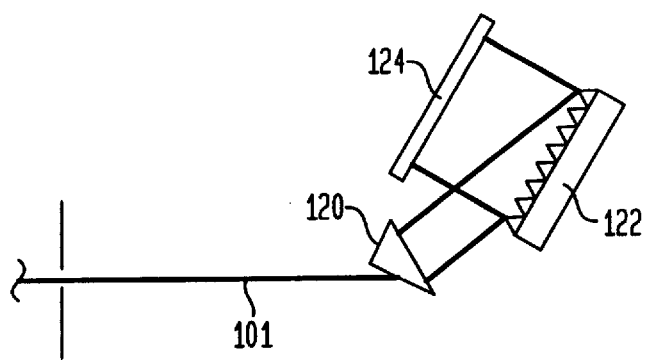
FIG. 4 is a schematic view of a portion of the oscillator in still another embodiment of the dual discharge tube excimer laser.

Bandwidth selection in the present invention is not limited to the three prism and optical grating arrangement described above. For example, as illustrated in FIG. 3, optical grating 114 could be replaced with a mirror 116 to increase the bandwidth of laser beam 101. As in the previous embodiment, the slit width of aperture element 104 can be increased to further increase the bandwidth of the laser beam. In FIG. 4, very narrow bandwidth selection is achieved by the use of a single prism 120, an optical grating 122 and a mirror 124, i.e., a near-grazing incidence design. In this design, prism 120 functions as appropriate magnification to fill optical grating 122. Mirror 124 serves as both a retro-reflector and a tuning element.

The entirety of the bandwidth-defined laser beam 101 is passed back through discharge tube 102 and aperture element 106 before impinging upon an output coupler 118. As is known in the art, output coupler 118 partially reflects laser beam 101 back into oscillator portion 100A and partially transmits laser beam 101A out of oscillator portion 10A.

Laser beam 101A is amplified by a amplifier portion 100B. In general, amplification of laser beam 101A is achieved with one pass through discharge tube 102 and two passes through a second discharge tube 130. Discharge tube 130 is also filled with a gaseous medium and has electrodes (not shown) along its length at its top and bottom.

The first amplification path through discharge tube 102 should match the discharge width of tube 102 and must not interfere with the lasing path of laser beam 101. Accordingly, it may be necessary to adjust the dimensions (e.g., height and width in terms of the rectangular cross-sectional shape of the illustrated example) of laser beam 101A. To do this, a telescope 132 adjusts (e.g., magnifies or reduces) the dimensions of laser beam 101A as necessary. Laser beam 101A is then turned back to discharge tube 102 by, for example, a pair of mirrors 134 and 136.

To reduce the ability of output coupler 118 to act as a rear reflector for ASE generated along the amplification path in tube 102, aperture elements 138 and 140 can be used. Specifically, aperture element 138 is positioned just after output coupler 118 and aperture element 140 is placed adjacent (e.g., underneath) output coupler 118.

After completing its first amplification path through discharge tube 102, laser beam 101A is prepared for its two amplification passes through discharge tube 130. Once again, it may be necessary to adjust the dimensions of laser beam 101A to match the width of discharge tube 130 and allow for two non-interfering passes through tube 130. To do this, a telescope 142 can be used to adjust the size of laser beam 101A to the size of the discharge in discharge tube 130, i.e., match the width of the discharge and adjust the height to allow for the two passes therethrough.

To direct laser beam 101A on its two non-interfering passes through discharge tube 130, a plurality of prisms 150/152/154/156 can be used. The use of prisms (as opposed to mirrors) is preferred because prisms can withstand laser energies, cost less than coated mirrors, can be used with any excimer gas mixture and transmit less ASE than mirrors. The output laser beam is referenced as laser beam 101B as it exits discharge tube 130 after laser beam 101A completes its second path therethrough.

In order to illustrate the advantages of the present invention, a specific example thereof was tested and will now be described. The gas in each of the discharge tubes was argon fluoride (ArF). The discharge tubes themselves were from a model LPX250T pulsed, dual-discharge tube ArF excimer laser available from Lambda Physik, Fort Lauderdale, Fla. The discharge tubes generated/supported production of a laser beam of rectangular cross-section.

Aperture element 104 was either a 1×3 mm or a 2×3 mm rectangular aperture. Aperture element 106 was a 2×3 mm rectangular aperture. Telescope 132 had a "3×" magnification while telescope 142 had a "2×" magnification. The specifics of optical gratings 114 or 122 are listed in Table 1 below which illustrates the broad bandwidth range achievable by the present invention.

| G | BW | M | α | P | POL | S | LB | O | A |
|---|---|---|---|---|---|---|---|---|---|
| 600 | 2700 | 14 | 79 | 1 | 10:1 | 1 | 0.17 | 0.03 | 125 |
| 600 | 2700 | 14 | 79 | 1 | 25:1 | 2 | 0.23 | 0.05 | 175 |
| 600 | 2700 | 14 | 54 | 3 | 35:1 | 1 | 0.33 | 0.8 | 285 |
| 600 | 2700 | 14 | 54 | 3 | 35:1 | 2 | 0.53 | 1.1 | 295 |
| 1200 | 750 | 4 | 28 | 3 | 35:1 | 1 | 1.1 | 0.9 | 285 |
| 1200 | 750 | 4 | 28 | 3 | 35:1 | 2 | 1.7 | 1.2 | 295 |
| 600 | 1000 | 5 | 17 | 3 | 35:1 | 1 | 3.2 | 0.8 | 285 |
| 600 | 1000 | 5 | 17 | 3 | 35:1 | 2 | 4.8 | 1.1 | 295 |
| Mirror | | 0 | 0 | 3 | 35:1 | 1 | 6.7 | 1.1 | 295 |
| Mirror | | 0 | 0 | 3 | 35:1 | 2 | 11.0 | 1.5 | 295 |

Table 1: Measured oscillator characteristics

In Table 1, the column headings are defined as follows:

"G" is the number of grating grooves per millimeter for optical grating 114 when three prisms are used and for optical grating 122 when one prism is used;

"BW" is the diffraction grating first-order Littrow blaze wavelength in nanometers (nm);

"M" is the diffraction order;

"α" is the angle of incidence;

"P is the number of prisms used;

"S" is the slit width of aperture element 104 in millimeters (mm);

"POL" is the horizontal-to-vertical polarization ratio;

"LB is the single-pulse laser bandwidth achieved in centimeters$^{-1}$ (cm$^{-1}$);

"O" is the output energy of the oscillator portion in millijoules (mJ); and

"A" is the output energy of the amplifier portion in millijoules (mJ).

All output energies were obtained with the laser tuned to 51,715 cm$^{-1}$.

As is evident from Table 1, a very broad range of laser bandwidths are achievable by simply modifying the optics at the rear end of the set-up. The narrowest bandwidths are achieved when using the set-up illustrated in FIG. 4 while the broadest bandwidths are achieved by the set-up illustrated in FIG. 3.

Figure 1:
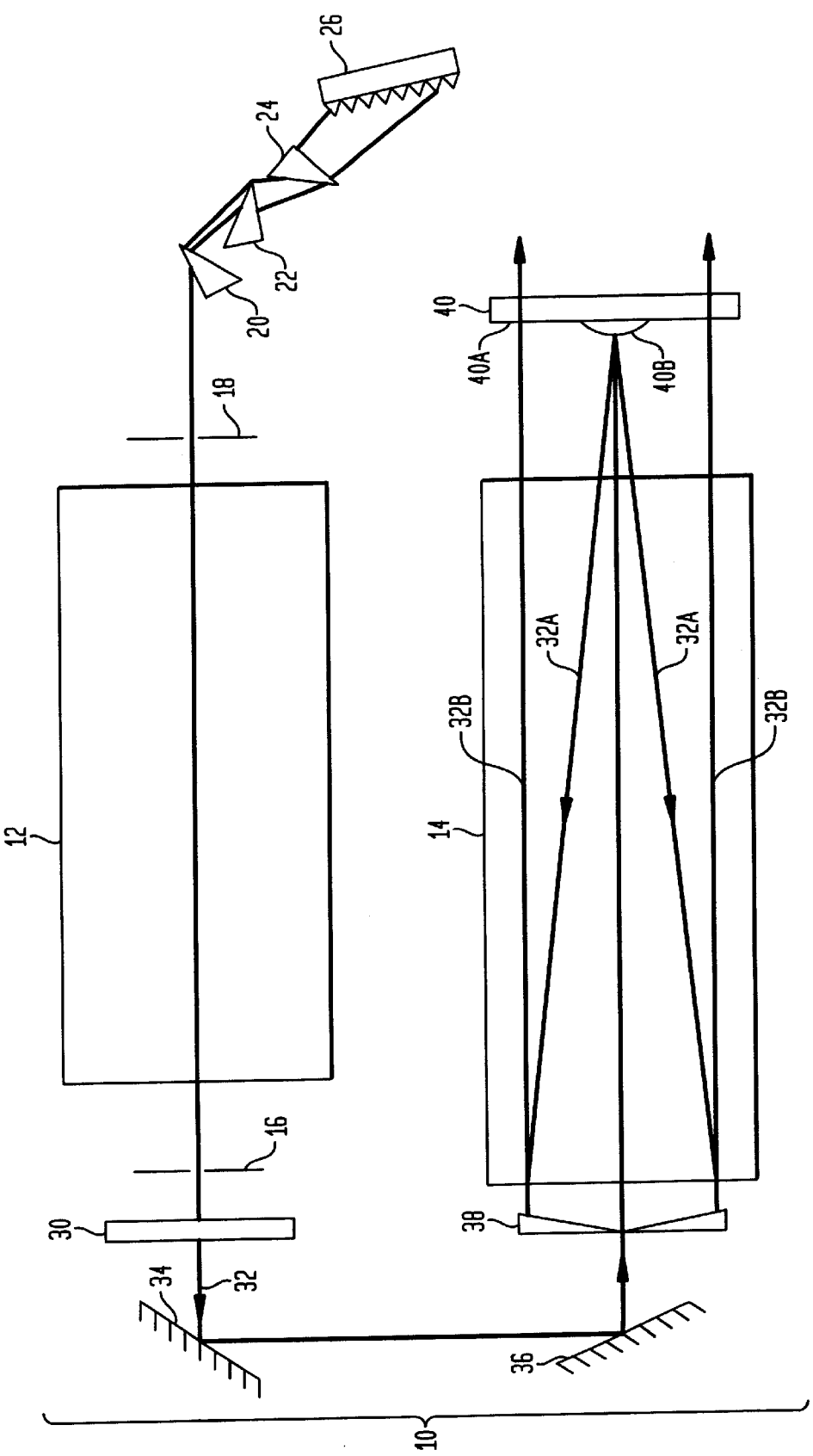
FIG. 1 is a schematic view of a prior art dual discharge tube excimer laser.

Table 2 below illustrates the advantages of the amplifier design of the present invention as compared with the standard design illustrated in FIG. 1. Specifically, the same oscillator arrangement was used with the prior art amplification design and the three-pass amplification design of the present invention (FIG. 2).

TABLE 2

Measured amplifier characteristics for "PRIOR ART" and "FIG. 2" amplification designs. Note that the optical grating used in the oscillator was a 600 groove/mm grating operating in the 14-th order and the slit width of aperture element 104 was 1 mm. The laser was again tuned to 51,715 cm$^{-1}$.

| Characteristic | Oscillator | Prior Art | FIG. 2 |
|---|---|---|---|
| Bandwidth (cm$^{-1}$) | 0.33 | 0.33 | 0.33 |
| Output energy (mJ) | 0.8 | 215 | 285 |
| Divergence (× diffraction limit) | 5 | 40 Horizontal 110 Vertical | 9 |
| Peak Locking Efficiency | 98% | 80% | 98% |
| Tunability (cm$^{-1}$) | 325 | 230 | 325 |
| Pulse duration (ns) | 15 | 13 | 15 |
| Pulse-to-pulse Fluctuation | 5% | 5% | 5% |
| Beam size (cm$^2$) | 0.03 | 2.3 | 0.8 |
| Polarization ratio | 35:1 | 30:1 | 35:1 |
| Spectral brightness (W/(cm$^2$ sr cm$^{-1}$)) | — | $6.56 \times 10^{12}$ | $1.44 \times 10^{15}$ |

Figure 5:
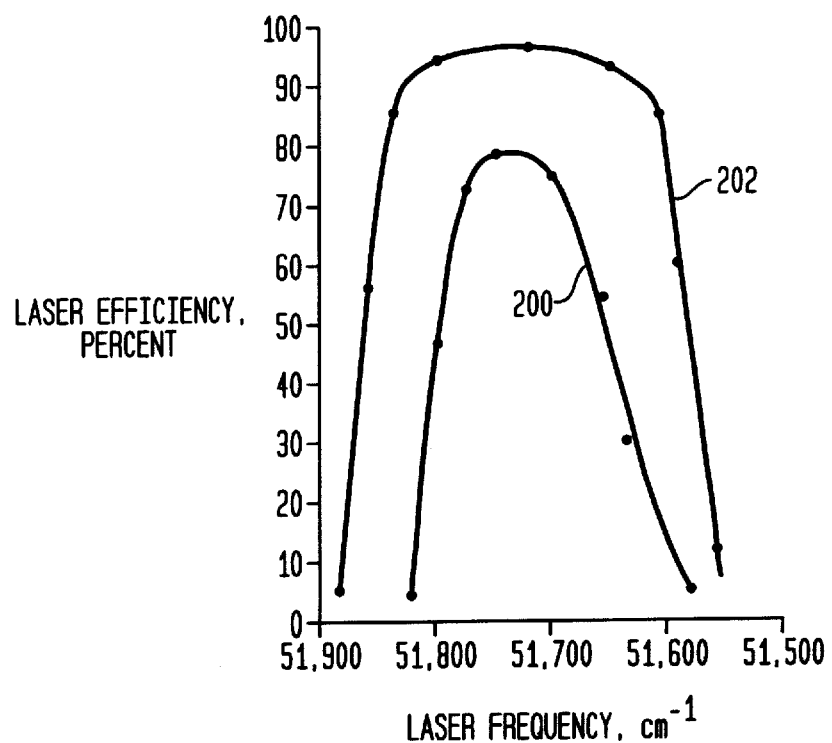
FIG. 5 is a graph illustrating laser locking efficiency for the prior art excimer laser design and the present invention's excimer laser design.

FIG. 5 graphically illustrates laser locking efficiency (i.e., the ratio of laser energy in the peak area for a desired narrow bandwidth of radiation to the energy in the total area at all frequencies produced by the laser) for both the prior art design and present invention. Specifically, curve 200 is the locking efficiency curve associated with excimer laser 10 and curve 202 is the locking efficiency curve associated with excimer laser 100.

As is evident from the above, the advantages of the present invention include substantial improvement in output energy, divergence, locking efficiency, tunability and spectral brightness. The oscillator design provides the ability to select a bandwidth from a broad range. The oscillator design improves beam energy output by matching aperture element slit geometry to that of the discharge tube-generated beam. The amplifier design produces improvement in a number of output characteristics.

Although the invention has been described relative to a specific embodiment thereof, there are numerous variations and modifications that will be readily apparent to those skilled in the art in light of the above teachings. For example, aperture elements 104 and 106 could be made to provide variable slit widths to simplify adjustment thereof. Additional optics could be placed in the amplification path to re-shape the laser beam for a particular application, e.g., laser eye surgery typically uses a laser beam of circular cross-section. Very small mirrors could be used in place of prisms 150/152/154/156 to direct or steer the laser beam. Further, the type of gas used in discharge tubes 102 and 130 is not a limitation on the present invention. It is therefore to be understood that, within the scope of the appended claims, the invention may be practiced other than as specifically described.

What is claimed as new and desired to be secured by Letters Patent of the united states is:

1. An excimer laser comprising:
   an oscillator having a first discharge tube filled with a gas having a lifetime of not more than 30 nanoseconds, said oscillator generating a laser beam having a cross-sectional shape as initially defined by said first discharge tube, said oscillator including means for selecting a bandwidth of said laser beam from a range of bandwidths defined by said gas and means for maintaining said cross-sectional shape of said laser beam within said oscillator and as said laser beam exits said oscillator;

an amplifier receiving said laser beam exiting said oscillator, said amplifier including a portion of said first discharge tube and a second discharge tube filled with said gas to form a multi-pass amplifier, said amplifier causing said laser beam to pass once through said first discharge tube and then traverse multiple passes through said second discharge tube, wherein said laser beam is directed along a unique return path to said second discharge tube between successive ones of said multiple passes;

first means disposed in a path of said laser beam defined between said oscillator and said second discharge tube for restricting laser beam divergence along said path; and second means disposed in each said unique return path for restricting laser beam divergence along each said unique return path, whereby divergence of said laser beam is decreased alone said path and each said unique return path while output energy, laser locking efficiency and tunability are increased resulting in an increased spectral brightness for said excimer laser.

2. An excimer laser as in claim 1 wherein said cross-sectional shape of said laser beam is rectangular, and wherein said oscillator's means for maintaining said cross-sectional shape comprises first and second rectangular apertures adjacent said first discharge tube at opposite ends thereof, wherein said laser beam exits said oscillator after passing through said second rectangular aperture.

3. An excimer laser as in claim 2 wherein said oscillator's means for selecting a bandwidth of said laser beam comprises:

said first rectangular aperture; and optics disposed adjacent said first rectangular aperture and in the path of said laser beam passing through said first rectangular aperture, said optics directing a selected bandwidth of said laser beam back through said first rectangular aperture.

4. An excimer laser as in claim 3 wherein said optics comprises:

an optical grating; and a plurality of prisms disposed between said optical grating and said first rectangular aperture.

5. An excimer laser as in claim 3 wherein said optics comprises:

a mirror; and a plurality of prisms disposed between said mirror and said first rectangular aperture.

6. An excimer laser as in claim 3 wherein said optics comprises:

a prism;

an optical grating; and a mirror, wherein said laser beam exiting said first discharge tube and passing through said first rectangular aperture is directed by said prism to said optical grating and then said mirror.

7. An excimer laser as in claim 2 wherein said first rectangular aperture is narrower in width than said second rectangular aperture.

8. An excimer laser as in claim 2 wherein said oscillator's means for selecting a bandwidth of said laser beam comprises said first rectangular aperture.

9. An excimer laser as in claim 2 wherein said oscillator's means for selecting a bandwidth of said laser beam comprises optics disposed adjacent said first rectangular aperture and in the path of said laser beam passing through said first rectangular aperture, said optics directing a selected bandwidth of said laser beam back through said first rectangular aperture.

10. An excimer laser comprising:

a first discharge tube filled with a a gas having a lifetime of not more than 30 nanoseconds wherein a lasing medium is generated when said first discharge tube is energized, said lasing medium having a cross-sectional shape defined by said first discharge tube, wherein said lasing medium exits said first discharge tube as a laser beam having a cross-sectional shape identical to said cross-sectional shape of said lasing medium;

first and second apertures disposed at either end of said first discharge tube to provide for the passage of said laser beam therethrough, each of said first and second apertures defining a slit geometry matching said cross-sectional shape of said laser beam;

optics disposed adjacent said first aperture for receiving said laser beam passing therethrough, said optics partially defining a bandwidth of said laser beam and then directing said laser beam back through said first aperture, said first discharge tube and said second aperture;

an amplifier receiving said laser beam exiting said second aperture, said amplifier including a portion of said first discharge tube and a second discharge tube filled with said gas to form a multi-pass amplifier, said amplifier causing said laser beam to pass once through said first discharge tube and then traverse multiple passes through said second discharge tube, wherein said laser beam is directed along a unique return path to said second discharge tube between successive ones of said multiple passes;

first means disposed in a path of said laser beam defined between said second aperture and said second discharge tube for restricting laser beam divergence along said path; and second means disposed in each said unique return path for restricting laser beam divergence along each said unique return path, whereby divergence of said laser beam is decreased along said path and each said unique return path while output energy, laser locking efficiency and tunability are increased resulting in an increased spectral brightness for said excimer laser.

11. An excimer laser as in claim 10 wherein said cross-sectional shape of said laser beam is rectangular, and wherein said first and second apertures are rectangular.

12. An excimer laser as in claim 11 wherein said first aperture is narrower in width than said second aperture.

13. An excimer laser as in claim 10 wherein said optics comprises:

an optical grating; and a plurality of prisms disposed between said optical grating and said first aperture.

14. An excimer laser as in claim 10 wherein said optics comprises:

a mirror; and a plurality of prisms disposed between said mirror and said first aperture.

15. An excimer laser as in claim 10 wherein said optics comprises:

a prism;

an optical grating; and a mirror, wherein said laser beam exiting said first discharge tube and passing through said first aperture is directed by said prism to said optical grating and then said mirror.

16. An excimer laser comprising:

an oscillator having a first discharge tube filled with a gas having a lifetime of not more than 30 nanoseconds, said oscillator generating a laser beam having a cross-sectional shape as initially defined by said first discharge tube, said oscillator including means for selecting a bandwidth of said laser beam and means for maintaining said cross-sectional shape of said laser beam within said oscillator and as said laser beam exits said oscillator;

a second discharge tube filled with said gas; and first directive optics for directing said laser beam exiting said oscillator on a first amplification path that passes once through said first discharge tube enroute to said second discharge tube;

second directive optics for directing said laser beam on multiple amplification passes through said second discharge tube, wherein said laser beam is directed along a unique return path to said second discharge tube between successive ones of said multiple amplification passes;

first means disposed in said first amplification path for restricting laser beam divergence therealong; and second means disposed in each said unique return path for restricting laser beam divergence therealong, whereby divergence of said laser beam is decreased along said path and each said unique return path while output energy, laser locking efficiency and tunability are increased resulting in an increased spectral brightness for said excimer laser.

17. An excimer laser as in claim 16 wherein said cross-sectional shape of said laser beam is rectangular, and wherein said oscillator's means for maintaining said cross-sectional shape comprises first and second rectangular apertures adjacent said first discharge tube at opposite ends thereof, wherein said laser beam exits said oscillator after passing through said second rectangular aperture.

18. An excimer laser as in claim 17 wherein said oscillator's means for selecting a bandwidth of said laser beam comprises:

said first rectangular aperture; and optics disposed adjacent said first rectangular aperture and in the path of said laser beam passing through said first rectangular aperture, said optics directing a selected bandwidth of said laser beam back through said first rectangular aperture.

19. An excimer laser as in claim 18 wherein said optics comprises:

an optical grating; and a plurality of prisms disposed between said optical grating and said first rectangular aperture.

20. An excimer laser as in claim 18 wherein said optics comprises:

a mirror; and a plurality of prisms disposed between said mirror and said first rectangular aperture.

21. An excimer laser as in claim 18 wherein said optics comprises:

a prism;

an optical grating; and a mirror, wherein said laser beam exiting said first discharge tube and passing through said first rectangular aperture is directed by said prism to said optical grating and then said mirror.

22. An excimer laser as in claim 17 wherein said oscillator's means for selecting a bandwidth of said laser beam comprises said first rectangular aperture.

23. An excimer laser as in claim 17 wherein said oscillator's means for selecting a bandwidth of said laser beam comprises optics disposed adjacent said first rectangular aperture and in the path of said laser beam passing through said first rectangular aperture, said optics directing a selected bandwidth of said laser beam back through said first rectangular aperture.

24. An excimer laser as in claim 17 wherein said first rectangular aperture is narrower in width than said second rectangular aperture.

25. An excimer laser as in claim 16 wherein said second directive optics include a plurality of prisms.

* * * * *